Patented Sept. 3, 1946

2,407,027

UNITED STATES PATENT OFFICE 2,407,027

MANUFACTURE OF CREAM SUBSTITUTES

Reginald Dean Mason, Richmond, and Aage Christian Justesen, Heston, England

No Drawing. Application January 5, 1943, Serial No. 471,387. In Great Britain November 18, 1942

10 Claims. (Cl. 99—63)

This invention relates to the manufacture of a cream substitute.

In the complete specification of our copending application Serial No. 378,674, filed February 12, 1941, we have described a process for the manufacture of a cream substitute; in that process we make use of an emulsifying agent which comprises a cellulose derivative which may be the derivative known under the registered trademark "Tylose" or the derivative known under the registered trade-mark "Cellofas." However, under conditions of national stringency such as those occasioned by the war, these two derivatives or other suitable cellulose derivatives are or may not be procurable in sufficient quantity for the purpose of manufacturing a cream substitute on a commercial scale. We have consequently been experimenting to discover materials which for this purpose could wholly or to a large extent take the place of cellulose derivatives. We have now found such materials; these are edible vegetable flours, particularly flours derived from the botanical group known as the Glycinae group and flours derived from the botanical family known as the Graminosae family. However, the edible vegetable flours do not by themselves produce an emulsion which is sufficiently stable and it is, therefore, necessary to add a harmless stabilising agent.

Accordingly, the process according to the invention comprises taking an edible vegetable and/or animal oil or fat base and emulsifying it with an aqueous serum containing an edible vegetable flour, and stabilising the emulsion with a harmless stabilising agent, an edible vegetable gum being incorporated for the purpose of minimising the tendency of the cream, when it has been beaten, to exude liquid serum on standing. The edible vegetable oil may be an oil of the Leguminosae group and/or an oil of the Palmae group.

The oil of the Leguminosae group may be hardened or unhardened arachis oil and/or hardened or unhardened soya bean oil and the oil of the Palmae group may be hardened or unhardened palm kernel oil and/or hardened or unhardened cocoanut oil. The animal oil or fat may be processed butter fat and/or other hardened animal fat or oil. The said other hardened animal oil or fat may be hardened whale oil, premier jus or oleo oil.

The edible vegetable flour may, as hereinbefore indicated, be a flour derived from the Glycinae and/or a flour derived from the Graminosae. A flour which is derived from the Glycinae and is particularly useful as an emulsifying agent when employed in the process according to the invention is soya bean flour, e. g., flour of the soya bean known as Glycina Hispida. The preferred grade of flour of the latter is the brand known as "Trusoy." As for the flour derived from the Graminosae family, useful ones for the purpose of the invention are those derived from the Secale group, e. g., rye, and those derived from the Avena group, e. g., oats. Two or more of the flours referred to may, if desired, be employed together. A useful effect of the flour is to assist materially in the production of a cream substitute having a good "overrun," i. e., a cream substitute which increases greatly in volume—up to about 200%—when it is whipped.

The stabilising agent may be an ionisable inorganic compound, preferably a salt of a tribasic acid such as a phosphate and/or a citrate. The stabilising agent may also contain a harmless chloride, e. g., common salt. A suitable amount of common salt improves the taste of the cream substitute.

The edible vegetable gum may be gum karaya and/or a marine vegetable gum, preferably an alginate, such as the brand of sodium alginate known under the registered trade-mark "Manucol." The effect of the vegetable gum is chiefly to minimise "weep," i. e., the phenomenon associated with cream in that when it is beaten it exudes a certain amount of liquid serum on standing.

Glyceryl monostearate and/or a phosphatide such as lecithin and a small proportion of a colouring constituent and of a flavouring essence are preferably incorporated in the cream substitute.

When a colouring constituent is incorporated, it is preferably added to the basic fat blend and may be prepared by blending a fat-soluble yellow dyestuff in a suitable proportion with a hardened vegetable fat or other suitable fat-soluble vehicle. A preferred method of preparing the colour constituent is the following:

The hardened vegetable fat or fat-soluble vehicle is melted and heated to about 60° C., after which the dry fat-soluble dyestuff is added and stirred until complete solution has been effected. The molten product is then filtered through a muslin filter or muslin filters or the like and a suitable quantity of a flavouring essence may also be added at this stage, after which the mass is cooled and poured into suitable containers and sealed for future use.

The flavouring essence may be prepared by mixing, in suitable proportions, the ethyl esters of pelargonic acid and butyric acid with the butyl esters of butyric acid and acetic acid, all dispersed in a common base consisting of a mixture of triacetin and diacetyl. The mixing should be conducted in a dry vessel.

The colouring constituent and flavouring essence are preferably added mixed together before being incorporated, and this mixture will hereinafter be referred to as "colour-flavour base."

The resulting crude emulsion produced as hereinbefore described is then subjected to a series of operations involving successively heating to a controlled temperature, homogenising at controlled pressures, cooling to controlled temperatures and keeping in cold storage at a controlled temperature.

If desired, a requisite proportion of a suitable substance rich in vitamins (e. g. vitamins A and D) may be included in the product; this could be introduced advantageously during the final cooling stages.

The final product, which resembles natural cream in consistency, appearance and flavour, is capable of being whipped to an aerated mass just like natural cream to give up to 200% overrun and, in the whipped state, of being piped and "worked" exactly as other similar products and also natural cream can be treated.

The following are examples of formulae and methods of preparation of the ingredients used in the production of a cream substitute by the process according to the invention:

SOLID CONSTITUENTS OF THE AQUEOUS SERUM CONTAINING THE EMULSIFIER

|  | Pounds | Ounces |
|---|---|---|
| "Trusoy" soya bean flour | 2 | 4.3 |
| Disodium hydrogen orthophosphate | 1 | 9.1 |
| Common salt | 0 | 4.5 |
| Gum Karaya | 1 | 2.2 |

The dry ingredients are mixed mechanically for about 10 minutes; the resulting mixture is then ready for use. The mixing time may be increased if larger batches are prepared.

FAT BASE

|  | Pounds | Ounces |
|---|---|---|
| Hardened arachis oil (melting point 32° C.) | 568 | 2 |
| Colour flavour base | 1 | 8 |
| Lecithin | 0 | 6 |

COLOUR-FLAVOUR BASE (a) Colouring constituent

Parts by weight
Fat-soluble powdered yellow dyestuff _____ 1
Hardened arachis oil, hardened soya bean oil, hardened coconut oil or glyceryl monostearate _____ 99

The fat is melted and maintained at 60° C. until the powdered dyestuff is dissolved. The product is then filtered through a muslin filter.

(b) Flavouring essence

Parts by volume
Ethyl pelargonate _____ 6.25
Ethyl butyrate _____ 8.75
Butyl butyrate _____ 6.25
Butyl acetate _____ 13.75
Diacetyl _____ 155.00
Triacetin _____ 60.00

The ingredients of the flavouring essence are measured out—for example, by graduated pipettes and measuring cylinders—and are mixed by shaking in a dry vessel. All the apparatus used in the preparation of the flavouring essence must be dry.

PREPARATION OF THE COLOUR-FLAVOUR BASE 5 parts by weight of the flavouring essence are added to 2,500 parts by weight of the colouring constituent and the resulting product is cooled until nearly solid while being slowly stirred to prevent the production of a eutectic mixture. This product is the colour-flavour base and should be stored in closed containers.

The pH value of the cream substitute may be adjusted to approximately 7.0 by the addition of a pH adjuster. A suitable pH adjuster has the following composition: Concentrated hydrochloric acid B. P., 6 ozs.; cold tap water, up to 1 pint.

EXAMPLE OF THE PRODUCTION OF A CREAM SUBSTITUTE BY THE PROCESS ACCORDING TO THE INVENTION

Stage 1

15¾ lbs. of the solid constituents of the aqueous serum containing the emulsifier are added to 30 Imperial gallons of tap water. The mixture is well stirred with a plunger to render the mixture homogeneous, after which the dispersion is allowed to stand for from 2 to 3 hours with occasional stirring. To this 30 gallons is added an additional 75 Imperial gallons of tap water and the whole mixture, to which 1 pint of the pH adjuster and 12 ozs. of glyceryl monostearate are added, is pasteurised at 100° to 105° C. after being well stirred. The product is the aqueous serum. The weight of this quantity of solution so prepared is substantially 1066 pounds.

Stage 2

570 lbs. of the fat base at a temperature of approximately 45° C. are injected, under a pressure of about 180 to 200 kilogrammes per square centimetre, into approximately 105 Imperial gallons or 1066 pounds of the aforesaid aqueous serum through nozzles having an orifice diameter of 0.5 mm., the pressure being applied by a high-pressure pump and regulation being effected by means of a valve. The intimate emulsion thus produced is passed to a storage tank after which it is passed to a pasteuriser and is pasteurised at 90°–95° C. The pasteurised product is then cooled to 75° C. and twice homogenised at 150 kilogrammes per square centimetre; the resulting homogenised product is then cooled in two stages, in the first stage to 28° C. by water cooling and in the second stage to 10° C. by brine cooling. If desired, the pressures in the two homogenization stages may be different, the first pressure being relatively high—e. g. 100 kilogrammes per square centimetre, and the second pressure being relatively low—e. g. 50 kilogrammes per square centimetre.

It will be noted that in the example just described, 570 pounds of arachis oil or other fat base is used with 15¾ pounds of the solid constituents of the aqueous serum as above described, a ratio of about 36 to 1.

A requisite proportion of a suitable substance rich in vitamins A and D may be included in the product in the course of these two cooling stages.

The final product is then pumped to a cold storage room at about 50° C. where it is allowed to mature before use.

In the case of the cream substitutes according to the invention, reduction of the proportion of the basic fat blend and variation of the proportions of the other ingredients as compared with the proportions hereinbefore stated gives a cream substitute which is good enough as a non-whippable cream for household purposes, e. g., coffee cream.

We claim:

1. The method of making a whippable cream substitute, comprising the steps of preparing an aqueous serum containing edible vegetable flour which is a member selected from the group consisting of glycinae and graminosae, and further containing as stabilizing agent an added ionizable salt of a tribasic acid, preparing a fat base which is a member selected from the group consisting of edible vegetable fats and oils and edible animal fats and oils, injecting said fat base in fine jets into said serum under a pressure of the order of 200 kilograms per square centimeter, and pasteurizing the emulsion thereby produced.

2. The method set forth in claim 1, said serum further containing an edible vegetable gum as a control agent.

3. The method set forth in claim 1, said serum further containing an edible vegetable gum and glyceryl monostearate.

4. The method set forth in claim 1, said serum further containing an edible vegetable gum and glyceryl monostearate and an acid pH adjusting agent for adjusting the pH value of the emulsion to substantially 7.0.

5. The method of making a whippable cream substitute, comprising the steps of preparing an aqueous serum containing soya bean flour and an ionizable salt of a tribasic acid and gum karaya, preparing a fat base consisting of hardened arachic oil, injecting said fat base in fine jets into said serum under a pressure of the order of 200 kilograms per square centimeter, and pasteurizing and homogenizing the emulsion thereby produced.

6. The method of claim 5, said serum further containing glyceryl monostearate.

7. A process for the manufacture of a whippable cream substitute, comprising making an aqueous serum from edible vegetable flour and vegetable gum, stabilizing said serum with a tribasic acid salt ionizable compound, pasteurizing the stabilized serum, injecting a fat base into the stabilized serum and thereby emulsifying said fat base, again pasteurizing, and then cooling and homogenizing the product.

8. A process for the manufacture of a whippable cream substitute, comprising making an aqueous serum from edible vegetable flour and vegetable gum, stabilizing said serum with a tribasic acid salt ionizable compound, pasteurizing the stabilized serum, injecting a quantity of a fat base comprising a hardened oil or fat into the stabilized serum and thereby emulsifying said fat base, said quantity of fat base being by weight of the order of 36 times the weight of the other said solid ingredients, again pasteurizing, and then cooling and pasteurizing the product.

9. A process for the manufacture of a whippable cream substitute, comprising making an aqueous serum from edible vegetable flour and vegetable gum, stabilizing said serum with a tribasic acid salt ionizable compound, pasteurizing the stabilized serum, injecting a fat base into the stabilized serum and thereby emulsifying said fat base, again pasteurizing, and then cooling and homogenizing the product, the process including the step of adjusting the pH value of the cream substitute to approximately 7.0.

10. The method of making a cream substitute which is whippable and has a high overrun comprising the steps of preparing an aqueous serum containing edible vegetable flour, which flour is a member selected from the group consisting of glycinae and graminosae, and further containing, as stabilizing agent, an added ionizable salt of a tribasic acid, preparing a fat base, from a member selected from the group consisting of hardened edible vegetable fats and oils and edible animal fats and oils, injecting said fat base in fine jets into said serum in a proportion of at least one part by weight of fat base to two parts by weight of serum and under a pressure of the order of 200 kilograms per square centimeter, and pasteurizing the emulsion thereby produced.

REGINALD DEAN MASON.
AAGE CHRISTIAN JUSTESEN.